United States Patent
Tipton et al.

(10) Patent No.: US 7,571,716 B2
(45) Date of Patent: Aug. 11, 2009

(54) FUEL SYSTEM WITH DIRECT CONNECTION BETWEEN FUEL PUMP, JET PUMP, AND FUEL FILTER

(75) Inventors: Larry Tipton, Sterling Heights, MI (US); Paul Daniel Reuther, Oxford, MI (US)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 11/908,540

(22) Filed: Mar. 21, 2008

(65) Prior Publication Data

US 2008/0190397 A1   Aug. 14, 2008

Related U.S. Application Data

(60) Provisional application No. 60/661,405, filed on Mar. 14, 2005.

(51) Int. Cl.
*F02M 37/00* (2006.01)
*F02M 37/10* (2006.01)

(52) U.S. Cl. .................................. 123/509; 123/468

(58) Field of Classification Search ................ 123/509, 123/506, 511, 514, 468, 469
See application file for complete search history.

(56) References Cited

U.S. PATENT DOCUMENTS

| 5,392,750 | A | 2/1995 | Laue et al. |
| 5,642,718 | A | 7/1997 | Nakai et al. |
| 6,129,074 | A | 10/2000 | Frank |
| 6,640,832 | B2 * | 11/2003 | Walter .................. 137/565.01 |
| 6,877,373 | B2 * | 4/2005 | Gilmour et al. ................ 73/313 |
| 6,951,208 | B2 * | 10/2005 | Milton ........................ 123/509 |
| 2002/0083929 | A1 | 7/2002 | Koller et al. |
| 2004/0011129 | A1 * | 1/2004 | Gilmour et al. ................ 73/313 |

FOREIGN PATENT DOCUMENTS

| EP | 0 959 241 A1 | 11/1999 |
| EP | 1 312 788 A2 | 5/2003 |

* cited by examiner

*Primary Examiner*—Mahmoud Gimie
(74) *Attorney, Agent, or Firm*—Oblon, Spivak, McClelland, Maier & Neustadt, P.C.

(57) ABSTRACT

Fuel system comprising a fuel tank, a main fuel supply pump (2), a fuel filter (4) comprising a housing and a filter element, a reservoir (10) within the fuel tank and a jet pump (3) for filling said reservoir, wherein a one piece connector (1) directly connects the main fuel supply pump (2), the fuel filter (4) and the jet pump (3).

16 Claims, 11 Drawing Sheets

FUEL SYSTEM WITH DIRECT CONNECTION BETWEEN FUEL PUMP, JET PUMP, AND FUEL FILTER

TITLE OF THE INVENTION

This application claims priority to U.S. provisional application 60/661,405, filed on Mar. 14, 2005.

BACKGROUND OF THE INVENTION

1. Field of the Invention

The present invention relates to the field of fuel systems that include a fuel pump, a jet pump and a fuel filter.

2. Discussion of the Background

To date, the fuel delivery modules (FDM) require a substantial reservoir capacity to provide enough reserve fuel for low fuel considerations.

It is namely so that in certain circumstances, for example, when the volume of fuel contained in the fuel tank of an automotive vehicle falls below a certain minimum level and this vehicle travels through a prolonged curve, uphill or downhill, or if it is otherwise subjected to sudden and pronounced changes in speed, direction, etc., the fuel could be displaced to one side of the tank to such an extent that the inlet end of the dip tube, which forms part of the fuel-intake tubing, is at least temporarily no longer submerged in the fuel. Under such conditions, the dip tube sucks out air instead of fuel, thereby producing an interruption in the feed fuel flow that impedes the proper operation of the internal-combustion engine.

In order to avoid such problems, most fuel tanks include a reservoir i.e. a subtank intended to trap fuel and act as a reserve.

The use of a jet pump to fill a fuel reservoir within a fuel tank is a common technology. Typically, there is a separate pressurized fuel line from the outlet of the fuel pump or positive pressure from a connection to the pumping element or the return fuel from a fuel pressure regulator which connects to and supplies a jet pump which fills the reservoir to provide a reserve fuel supply for the fuel pump for low fuel conditions such as:

Hard acceleration/deceleration

Extended turns like a "clover leaf" on a highway access or egress.

Ascending or descending grades, (i.e. Sandia Pass in New Mexico)

This Fuel line is in addition to the supply line to the engine and requires additional clamps and fittings to complete the circuit. Packaging the jet pump components presents complications in terms of locating the features without adding complexity to the reservoir and/or fuel pressure supply line. These additional components also add to the potential failure modes that must be considered and addressed with corrective actions in the design of the fuel delivery module.

Additionally, static electricity can build up within the pump, filter media and flow path to the point where the potential is high enough to cause an electrical discharge to the nearest ground point. This can cause electrical noise or, in the worst case, a thermal event inside the fuel tank. To solve that problem, a wire is often used to connect the negative (ground) terminal of the pump or the negative ground terminal of the fuel level sender and the conductive plastic filter housing. Any static charge built up in the filter housing will be conducted to this terminal.

A direct contact between pump and filter media could eliminate such a problem and the need for a ground wire and its associated failure modes. A direct contact between pump and filter has been proposed in U.S. Pat. No. 5,642,718, which does not address however the problems of the jet pump location/connection.

SUMMARY OF THE INVENTION

The idea behind the present invention is to use a piece of adequate geometry for connecting directly (without any lines extending between them) not only the main fuel supply pump and the fuel filter, but also, the jet pump aimed at filling the reservoir wherein the main pump is located.

Accordingly, the present invention concerns a fuel system (preferably for an automotive engine) comprising a fuel tank, a main fuel supply pump, a fuel filter, a reservoir within the fuel tank and a jet pump for filling said reservoir, wherein a one piece connector directly connects the main fuel supply pump, the fuel filter and the jet pump.

According to the invention, a "one piece" connector may also designate a piece molded in several parts which have been assembled by welding, gluing .... However, it preferably is a piece molded in one part, for instance by injection molding.

This single piece preferably has the form of a "T" into which, in one branch, the pump is plugged in, the 2 other branches being connected one to the fuel filter and the other, to the jet pump. This eliminates the multiple components required to create the pressurized line and the independent passage for operating the jet pump. This typically means at least 3 less components (fuel line & 2 clamps) and a multiple reduction in failure modes. Additionally it eliminates the negative ground terminal and wire harness for conducting ESD charges.

For practical reasons, the one piece connecting part will be designated by "T" connection further on, but it is worth noting that the present invention covers also other geometries.

This "T" connection is preferably a plastic part, which can be molded of—or comprise at least in surface (preferably both on its internal and external surfaces)—a conductive plastic for EDS (Electro-Static Discharge) requirements. The preferred plastic is a polyacetal and most preferably, POM (polyoxymethelene) which is stable in fuels. It can be made conductive by adding conductive charges into it (like carbon black or carbon fibers).

Conductivity requirements mainly depend on the customers' needs and may extend to the filter parts, which generally at least comprise a housing (generally molded in 2 pieces—a bottom (lower part) and a cover (upper part)—which are generally welded) and a filter media/element. In some cases, the cover of the filter may be molded as one part with the cover of the reservoir, which eases mounting, saving one part.

Accordingly, there are mainly 3 cases:

No conductivity required. Basic non-conductive plastic housing, filter media and "T" connection Partial conductivity. This will require only a conductive filter element pressed into the lower filter housing molded with conductive plastic as well, the upper filter housing being of non conductive plastic. The "T", molded of conductive plastic, has an integral molded frame that will press around the grounded pump shell to complete the path to the negative pump terminal.

Full conductivity. Some customers require the entire fuel flow path from the grounded pump shell to the molded tube in the flange extending from the fuel filter cover or from the reservoir cover (the case being) to the fuel line to the engine. In this case, the upper filter housing will also be molded with conductive plastic along with the conductive fuel tube connected to the flange.

Accordingly, a "T" connection made of conductive material is generally used in combination with at least the lower filter housing and the filter element being conductive as well, so that charges built up in the filter can be grounded to the pump through said connection.

As already evoked above, the reservoir according to the invention may be provided with a cover. According to a preferred embodiment, this cover is molded in one piece with the filter cover, said integrated cover being—at least on its surface—of conductive material in the case of full conductivity solutions.

In a preferred embodiment, said "T" connection directly integrates the jet pump, i.e. a venture tube with an orifice through which pressurized fuel coming out of the main fuel supply pump can create a flow which sucks fuel from the main fuel tank into a passage in the reservoir for filling it.

In another preferred embodiment, the venture tube with the orifice is integrated in the reservoir and the "T" connection plugs in said tube.

And in a last preferred embodiment, half of the venture tube is integrated to the "T" connection and the other half, to the reservoir.

In all these preferred embodiments, most preferably, a first fill valve is connected on the passage in the reservoir through which the jet pump sucks. This valve is aimed at filling the reservoir during the very first filling of the fuel tank or when it has run dry. This valve may be of any type, an umbrella valve giving good results however.

According to another preferred embodiment, at least part of the above mentioned "T" connection is molded in one piece with at least part of the filter housing, for instance, with the lower part of it. Alternatively or additionally, said filter housing (preferably, the lower part of the filter housing) can also be molded to retain (or integrate the housing of) a fuel pressure regulator.

BRIEF DESCRIPTION OF THE DRAWINGS

The above described inventive concept is illustrated in a non limitative way by FIGS. 1 to 5, wherein.

DETAILED DESCRIPTION OF THE PREFERRED EMBODIMENTS

In these figures, identical numbers designate similar or identical parts.

Figure 1:
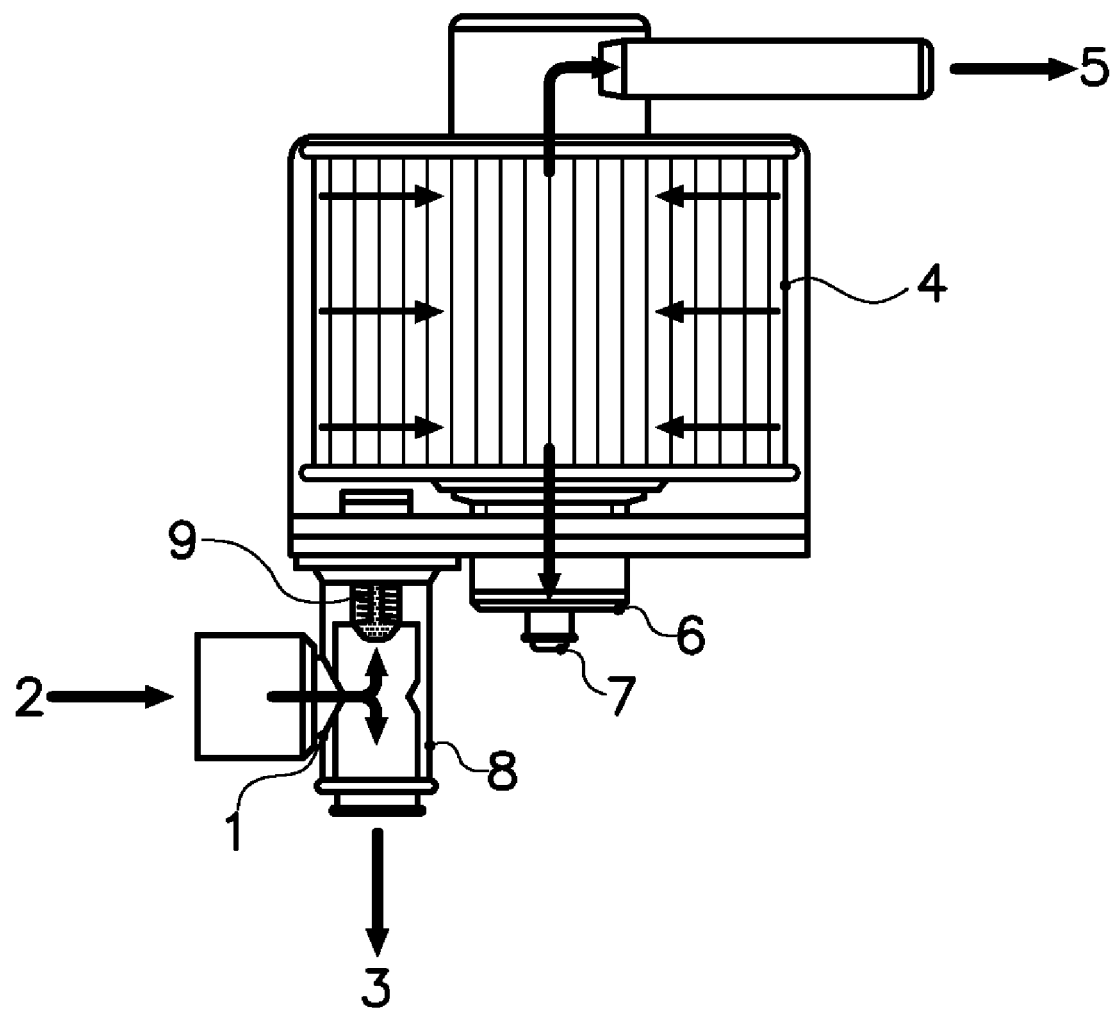
FIG. 1 is a schematic representation of one embodiment according to the invention.

FIG. 1 illustrates part of a fuel system according to an embodiment of the invention, namely: a one piece "T" connector (1) which receives fuel directly from a fuel pump (2, not pictured) and distributes it to a jet pump (3, not shown) and to a fuel filter (4). Into the latter, the incoming fuel (i.e. the fuel before filtration) is pictured by white arrows and the outcoming fuel (i.e. the fuel after filtration) is pictured by black arrows. When it leaves the filter, the fuel is routed to the engine (5, not pictured) at a flow rate controlled by a pressure regulator (6) which has a discharge port (7) to a second jet pump (not pictured) for saddle tank applications. There are 2 valves on this system: an anti-siphon valve (8) located before the jet pump and a check valve (9). The anti-siphon valve (8), (not visible on the figure; only its location is indicated) keeps the reservoir from draining out through the fuel pump and out the jet orifice. The check valve (9) maintains the fuel pressure when the engine is turned off (this residual pressure is important in order to avoid long engine cranking before building up the pressure to inject the fuel for restarting). In this embodiment, the "T" (1) is a separate part into which the mail fuel supply pump (2), the jet pump (3) and the fuel filter (4) are plugged.

In the embodiment according to FIGS. 2 to 6, the "T" (1) is an integral part of the plastic lower filter housing (4') and it integrates the jet pump (i.e. it contains the jet orifice) for filling the reservoir. The lower housing (4') connects to a filter element (cartridge, not shown) with a press fit. For OEMs that require the entire fuel flow path (which includes the jet pump passage) to be conductive for ESD, this lower housing including the "T" is molded with conductive plastic. It can be molded with non-conductive for other OEMs that do not require ESD removal. The filter element may also be made conductive for ESD removal through the lower filter housing for partial or full conductivity path to the pump shell.

Four molded latches ($4'_1$) on the profile of the lower filter housing snap into corresponding slots on the reservoir wall (not shown in this figure) to retain the filter. The lower filter housing (4') also retains a fuel pressure regulator (6) with a snap fit to other lower filter housing latches.

The upper filter housing (4") connects to the filter element and is welded to the lower filter housing (4'). This piece (4") can be molded with conductive plastic to remove ESD. It integrates a fuel outlet tube (5') which connects to a plastic hose to deliver fuel to the engine though a remote flange (not shown).

A fuel pump (2) plugs into an extension of the "T" (1). This pump (2) is contained in a shell grounded to the negative pump terminal. The "T" (1) holds a rubber seal (not shown) that secures the fuel pump attachment. The "T" (1) will have a molded frame on the conductive versions which will contact the pump shell to complete the required ground path to the negative terminal.

Figure 3:
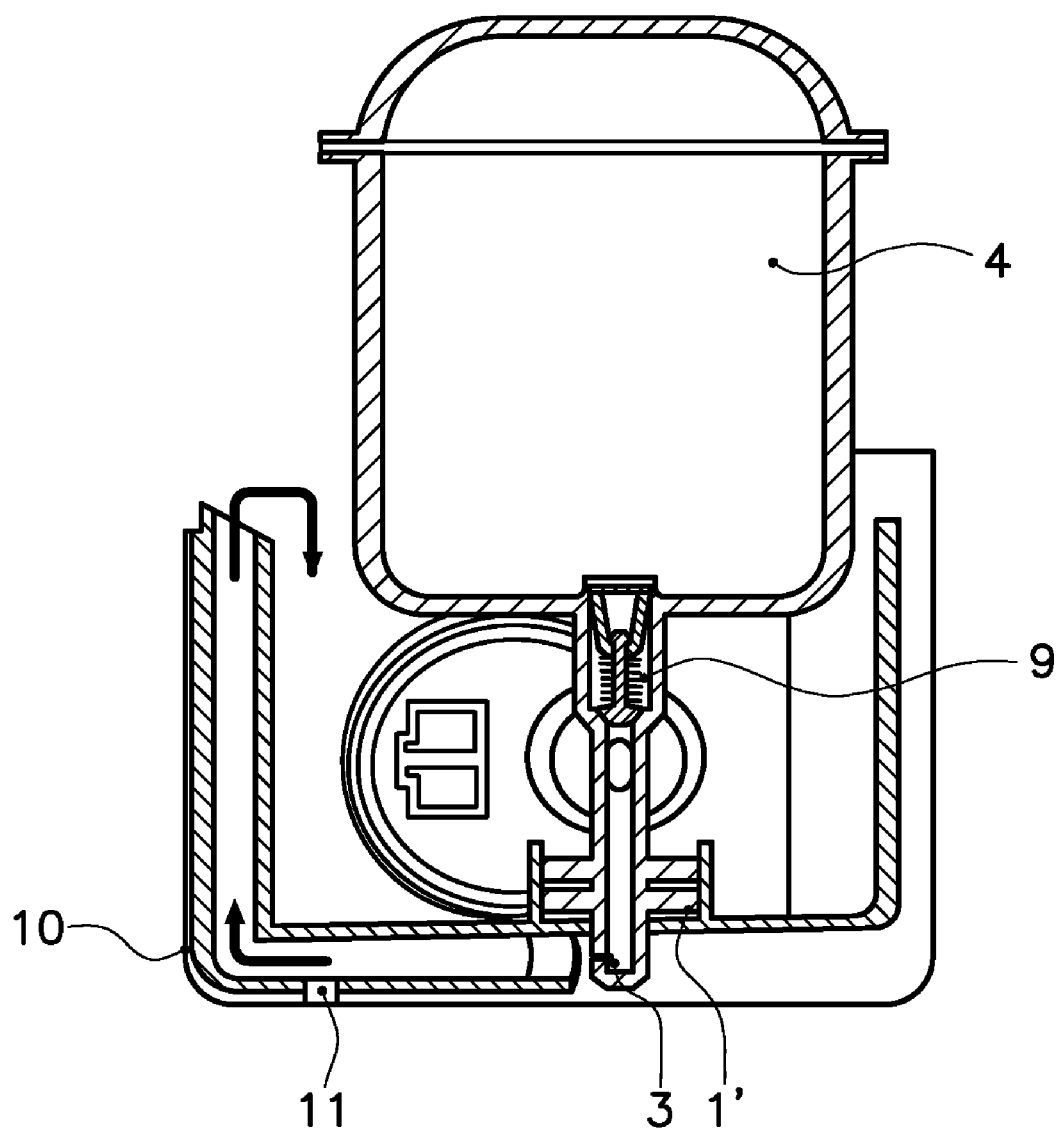
FIG. 3 shows a transversal cut into said assembly inserted into a reservoir.

FIG. 3 shows all these parts assembled/mounted inside a fuel reservoir (10). For this mounting, first, the pump is pressed into the pump shell. This shell has extensions molded on each side which slide into corresponding slots on reservoir wall not shown). Then, 2 molded disks (1') on the "T" are pressed into a corresponding molded feature in the reservoir floor which creates the required seal.

The jet pump orifice (3) is integrated in the lower part of the "T" and through this orifice, a flow a fuel is created which sucks fuel in the fuel tank outside the reservoir (10) through an opening (11) in said reservoir, so creating a fuel flow constantly filling the reservoir with fuel from the tank (pictured by white arrows).

Figure 4:
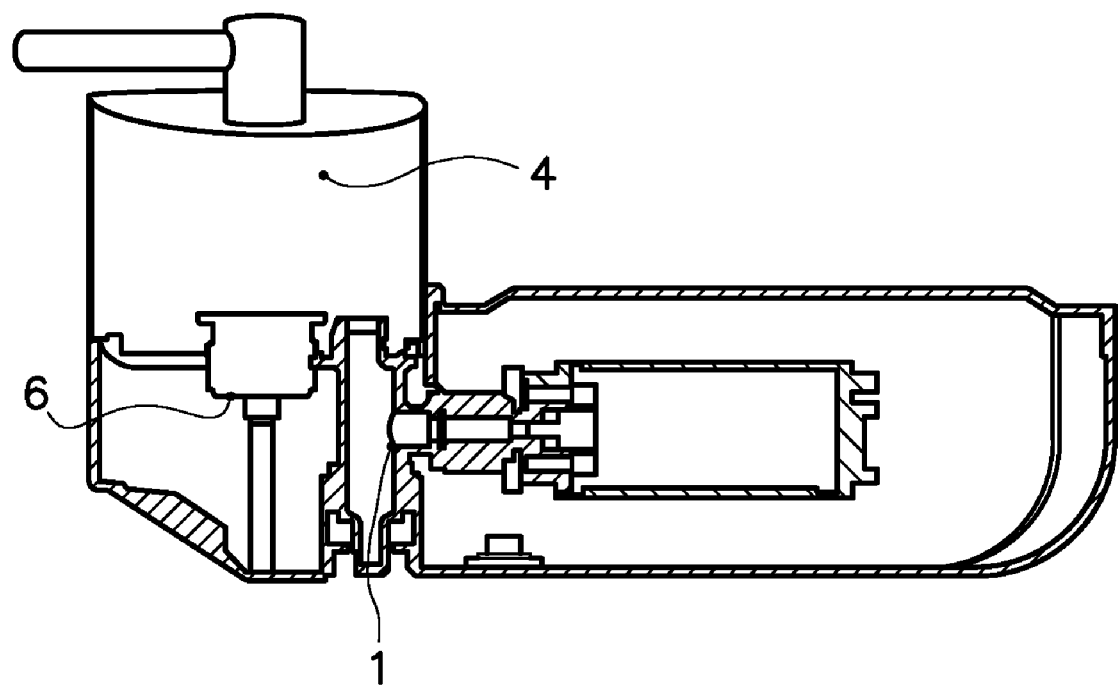
FIG. 4 shows a longitudinal cut into the same assembly.

FIG. 4 shows how both the pressure regulator (6) and the "T" (1) are molded integrally with the filter (4), resulting in multiple functions in a condensed assembly of lower cost.

Figure 2:
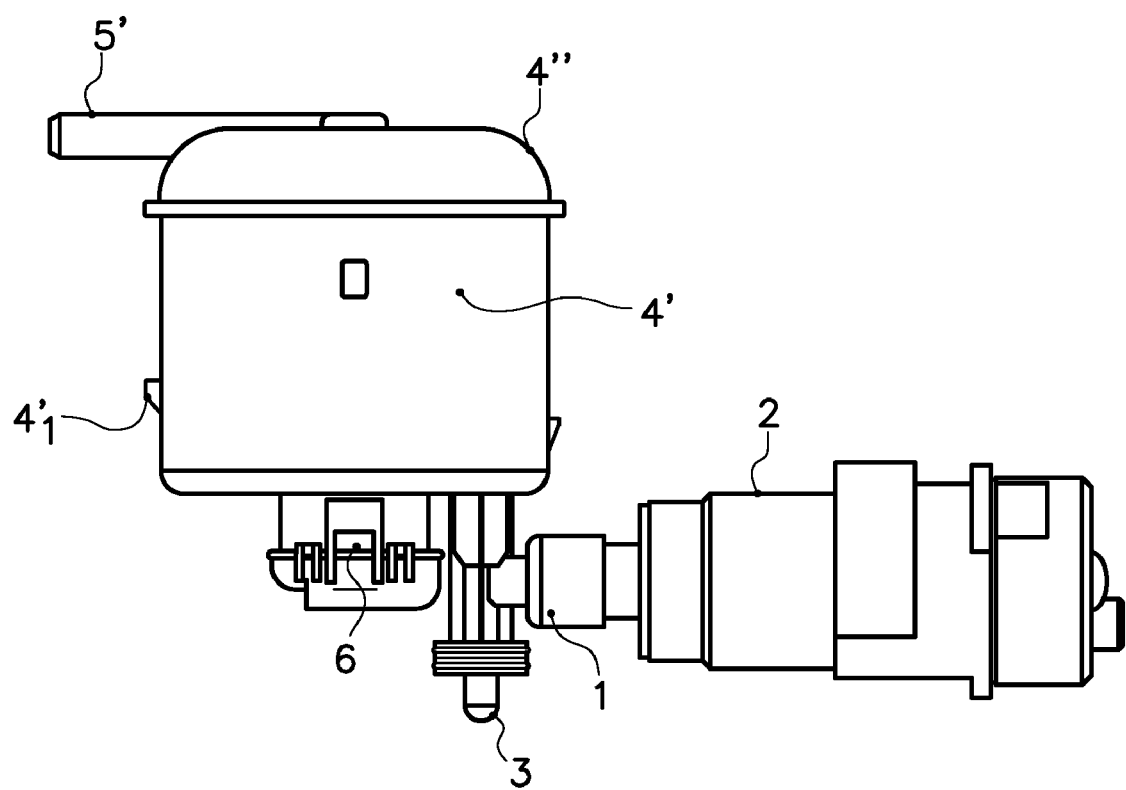
FIG. 2 shows an assembly of components according to another embodiment.
Figure 5:
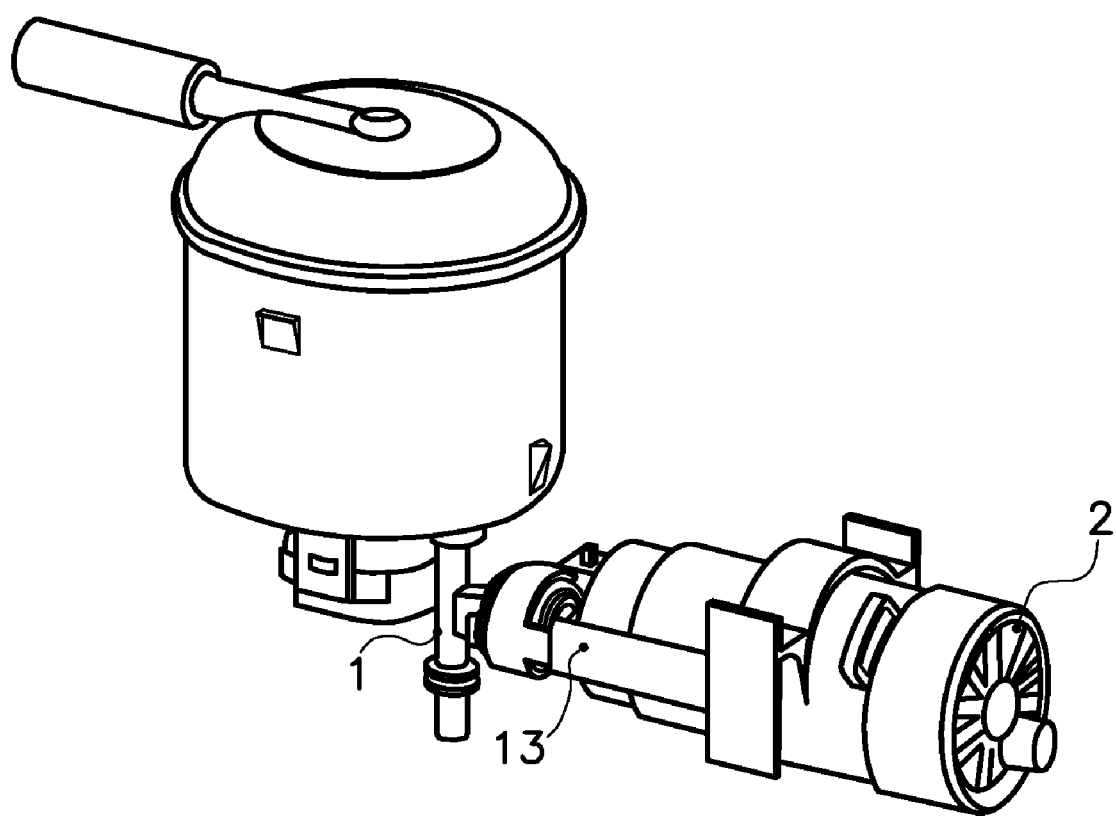
FIGS. 5 and 6 show some preferred aspects of the same embodiment.

FIG. 5 completes in fact FIG. 2 and shows how a molded extension of the pump holder (13, not shown in FIG. 2) clips to the "T" (1) to complete the grounding path back to the negative terminal of the fuel pump (2). This eliminates the need for a ground wire.

Figure 6:
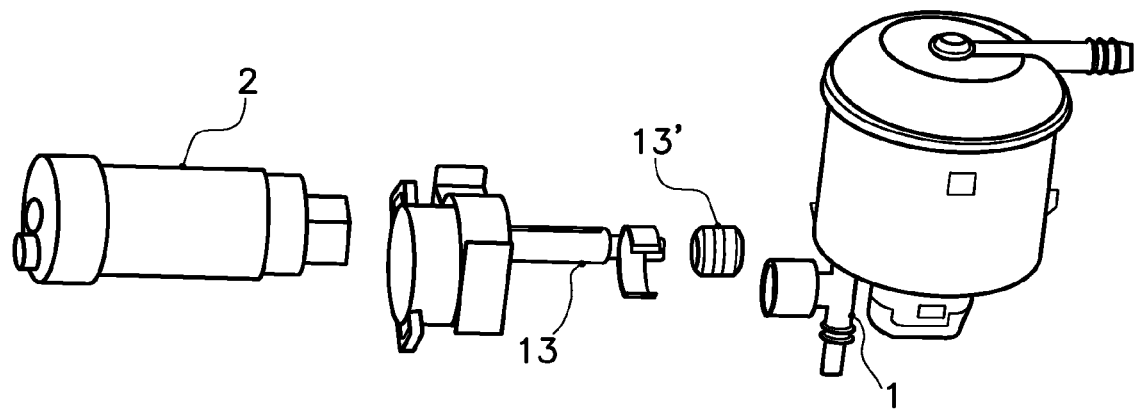

FIG. 6 shows the same parts, but disassembled (exploded view). To switch to the assembly of FIG. 5, the pump (2) is internally grounded to the pump shell which is then pressed into the pump holder (13). The entire assembly is then plugged into the "T" (1) by means of a rubber seal (13').

Figure 7:
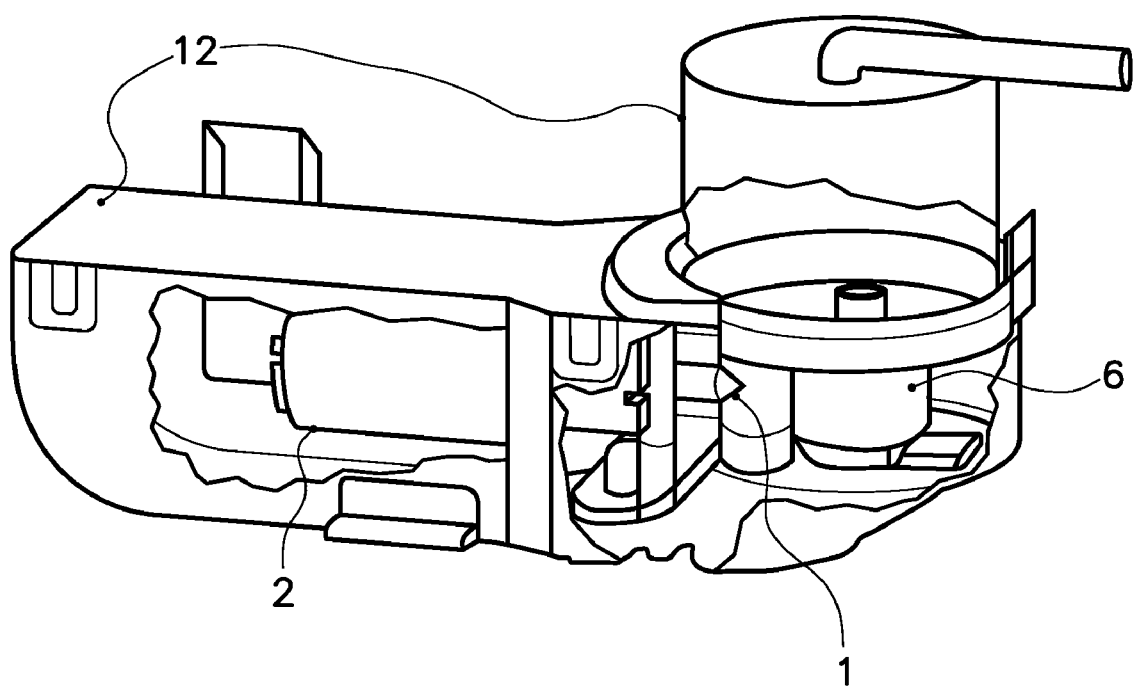
FIG. 7 shows a schematic diagram of a third embodiment of the present invention.

FIG. 7 illustrates another embodiment according to which the reservoir cover (12) is molded integrally with the upper filter housing.

Finally, FIGS. 8 to 11 show a fourth embodiment, according to which the jet pump (3) sucks through a first fill valve (14), which is an integrally molded disc valve according to a co-pending application. The valve pictured comprises:

A piece of material (17, called a disk, although it might be in the shape of a square) with a hole in it, preferably in its center.

A post that fits through the hole in the disk.

Several holes through the reservoir's bottom which are positioned around the post and in a way such that the disk covers them when positioned with the post inside its central hole and when is in its relief position (no pressure lifting the disk).

Figure 8:
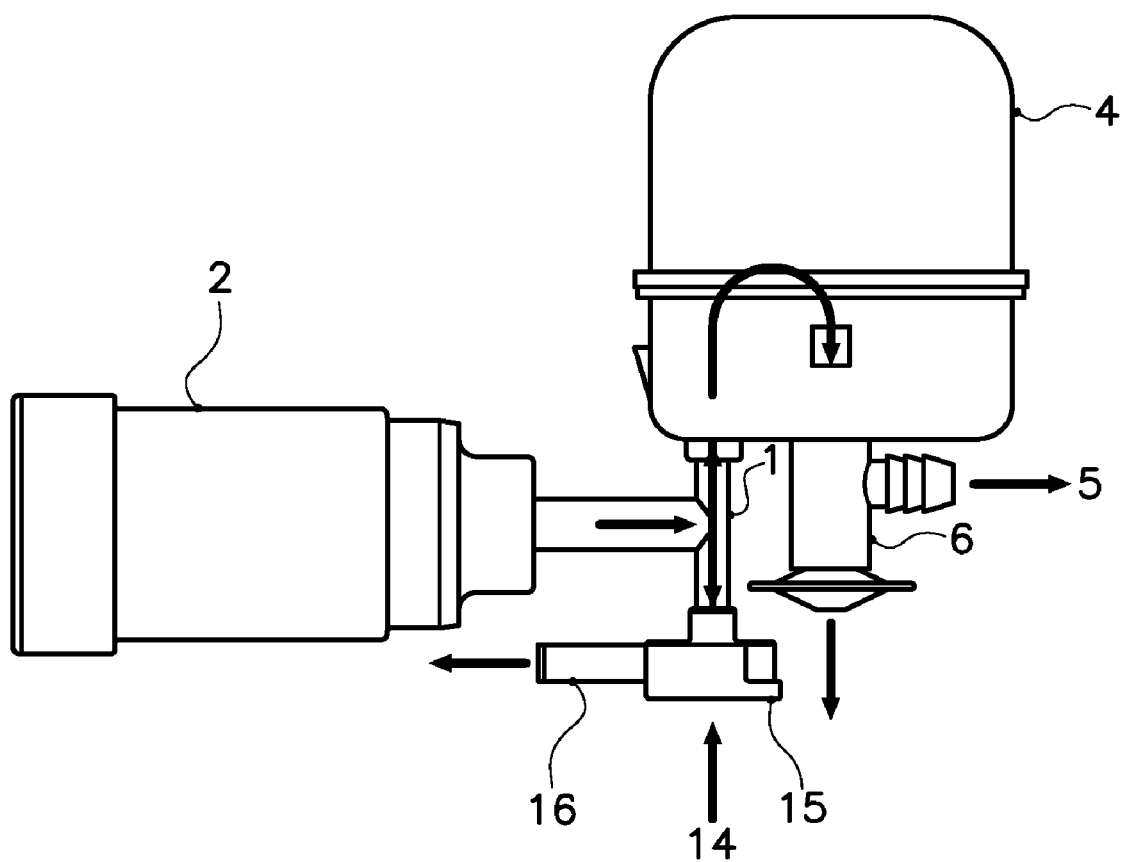
FIGS. 8 to 11 show a last, fourth embodiment of the present invention.

FIG. 8 shows how the pump (2) discharges into the "T" (1) a fuel flow which is split into a flow to the fuel filter (4) and a flow to a jet pump orifice integrated in a housing (15). The fuel exits the fuel filter (4) through a pressure regulator (6) which routes the required amount of fuel to an engine (5, not pictured) and returns the rest to the reservoir. The jet pump integrated in the cover (15) sucks fuel from the fuel tank through the first fill valve (14, not pictured) and a mixing tube (16) discharges into the reservoir, a mixed flow of fuel coming from the pump (2) on one side (through the "T" (1) and the jet pump) and from the fuel tank (though the first fill valve) on the other side.

Figure 9:
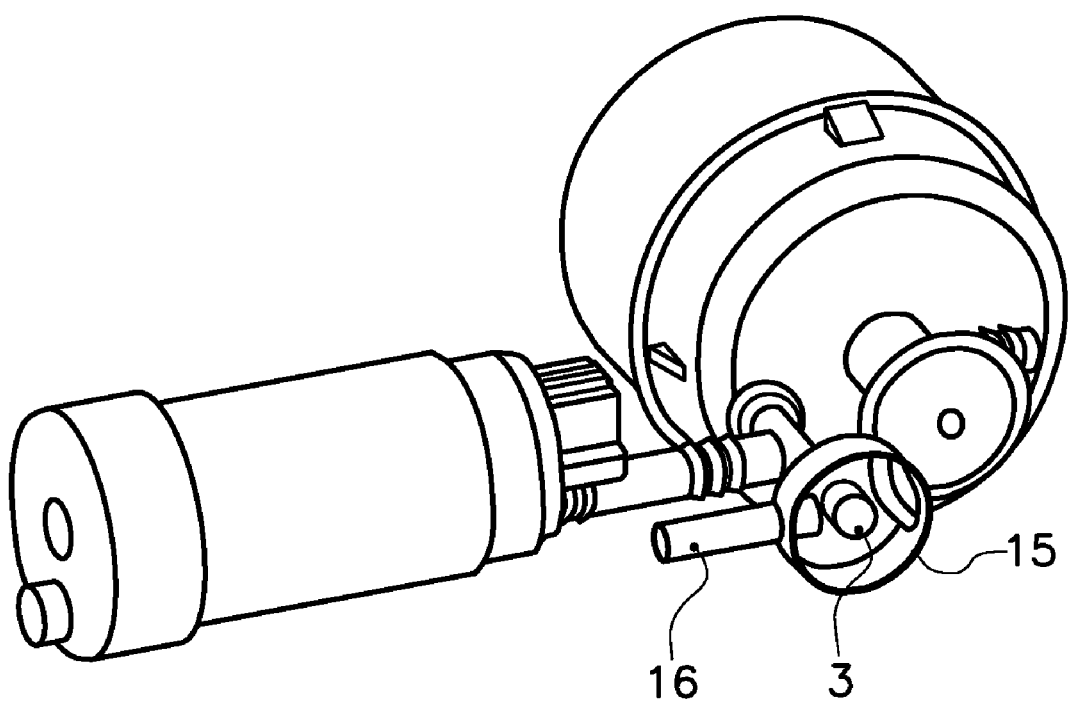

FIG. 9 shows the same assembly but viewed from underneath to illustrate how a small jet orifice (3) blows right into the mixing tube (16), entraining from the fuel tank.

Figure 10:
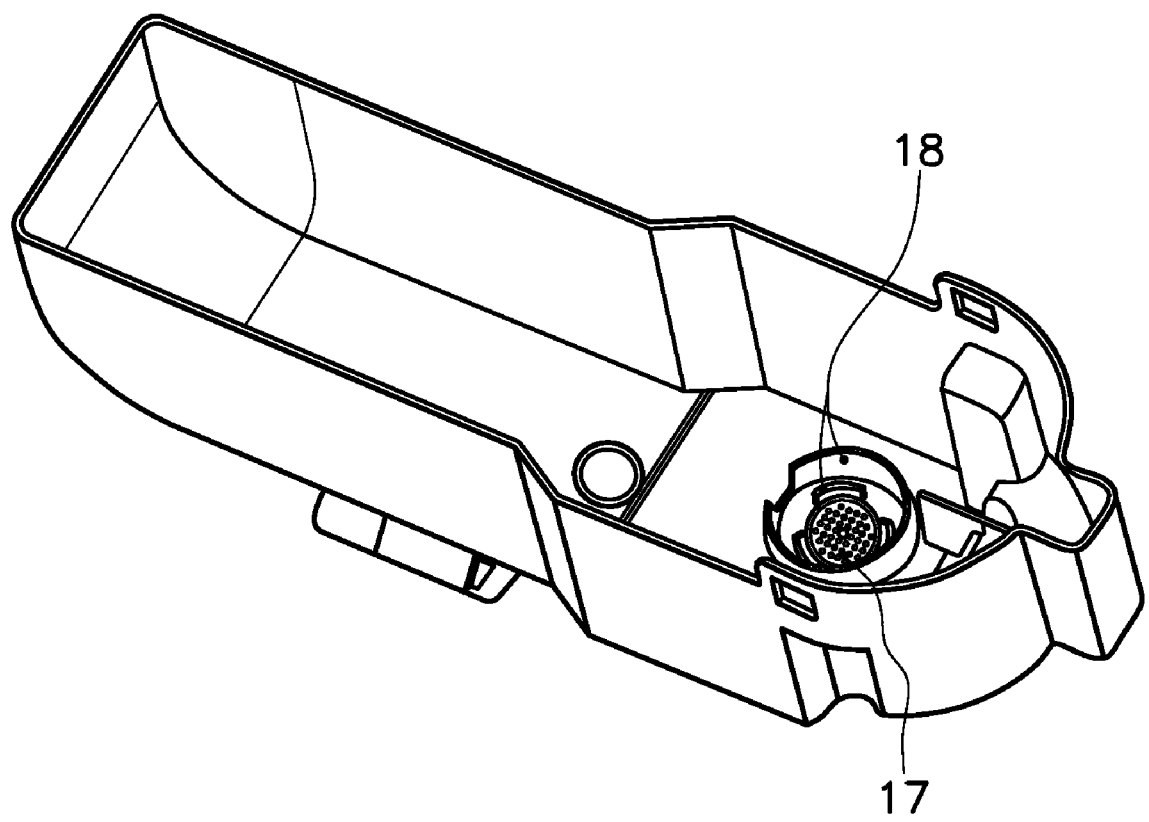

FIG. 10 shows the bottom of the reservoir wherein the system of FIGS. 8 and 9 is intended to be mounted. This bottom comprises an integrally molded disk valve surrounded by a perimeter wall (18). This valve comprises a rubber disk (17) which:

is opened by fuel being drawn into the holes of the bottom of the reservoir (not shown) by the jet flow; and which seals said holes when the jet flow stops to retain reservoir capacity.

This valve eliminates the need for the check valve in the pump outlet to prevent fuel from siphoning out of the reservoir.

The housing (15) integrating the jet pump presses into the perimeter wall (18) of the reservoir bottom to function as a partial seal to allow the jet flow to draw fuel through the floor of the reservoir rather than recirculation of the fuel inside the reservoir.

Figure 11:
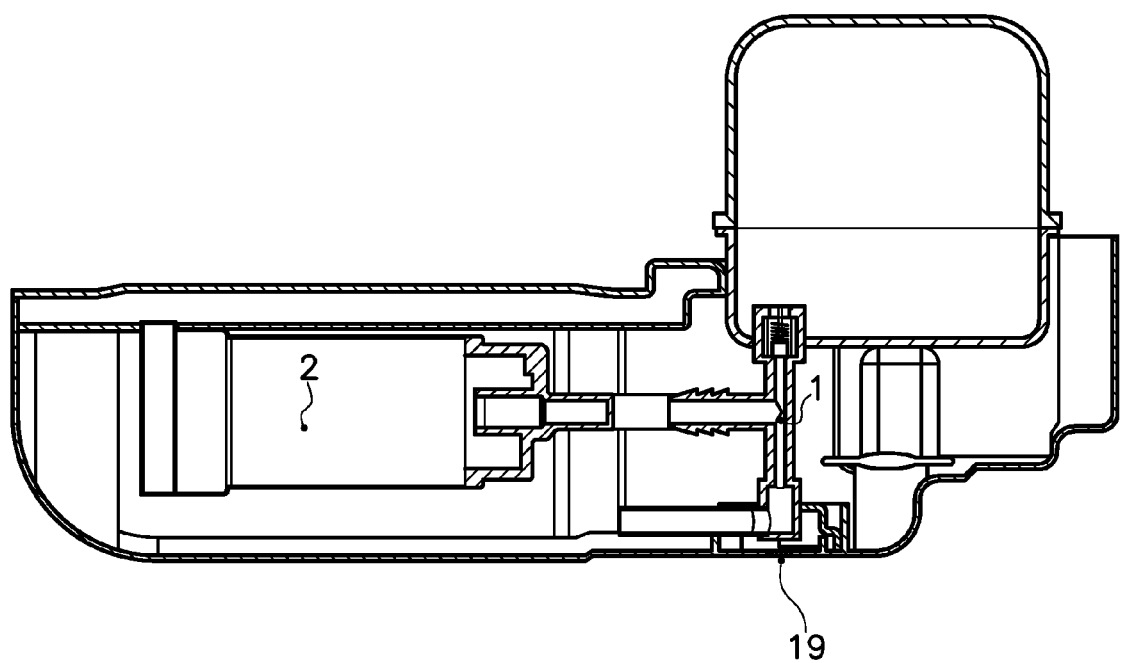

FIG. 11 show a longitudinal cut into the system assembled in the reservoir and shows the holes (19) into the bottom of it, holes through which fuel can be sucked from the fuel tank where the reservoir is located (not shown).

The invention claimed is:

1. A fuel system comprising a fuel tank, a main fuel supply pump, a fuel filter comprising a housing and a filter element, a reservoir within the fuel tank and a jet pump for filling said reservoir, wherein a one piece connector directly connects the main fuel supply pump, the fuel filter and the jet pump such that said one piece connector directly contacts said main fuel supply pump, said fuel filter and said jet pump, and such that said fuel system is free of any fuel line between said main fuel supply pump, said fuel filter and said jet pump.

2. The fuel system according to claim 1, wherein the one piece connector has the form of a "T" having 3 branches into which, in one branch, the pump is plugged in, the 2 other branches being connected one to the fuel filter and the other, to the jet pump.

3. The fuel system according to claim 1, wherein the one piece connector is made of plastic material.

4. The fuel system according to claim 3, wherein the one piece connector comprises conductive plastic material at least on its surface.

5. The fuel system according to claim 4, wherein the filter housing is in 2 parts (one upper and one lower part) and wherein the lower filter housing and the filter element comprising conductive material at least on their surface.

6. The fuel system according to claim 1, wherein both the filter and the reservoir have a cover and wherein both covers are molded in one piece.

7. The fuel system according to claim 1, wherein the jet pump comprises a venturi tube with an orifice through which pressurized fuel coming out of the main fuel supply pump can create a flow which sucks fuel from the main fuel tank into a passage in the reservoir, said venturi tube being integrated either to the one piece connector, to the reservoir or to both.

8. The fuel system according to claim 7, wherein a first fill valve is connected on the passage in the reservoir through which the jet pump sucks.

9. The fuel system according to claim 1, wherein the one piece connector is molded in one piece with at least part of the filter housing.

10. The fuel system according to claim 1, wherein the filter housing is molded to retain a fuel pressure regulator.

11. The fuel system according to claim 1, wherein said one piece connector has at least one conductive surface such that said fuel filter, said main fuel supply pump and said jet pump are electrically connected to each other via said one piece connector.

12. The fuel system according to claim 11, said fuel system being free of any electrical wire between said fuel filter and ground.

13. The fuel system according to claim 1, wherein said one piece connector is an integral part of said fuel filter.

14. The fuel system according to claim 13, wherein said one piece connector integrates the jet pump.

15. The fuel system according to claim 1, wherein said one piece connector is a single piece of plastic extending from said main fuel supply pump to said fuel filter and to said jet pump.

16. The fuel system according to claim 15, wherein said one piece connector is a single piece of molded plastic.

* * * * *